United States Patent [19]

Gross et al.

[11] Patent Number: 5,797,605
[45] Date of Patent: Aug. 25, 1998

[54] WORKHOLDING APPARATUS

[75] Inventors: William E. Gross, Ontario; Charles G. Ellwanger, Rochester, both of N.Y.

[73] Assignee: The Gleason Works, Rochester, N.Y.

[21] Appl. No.: 766,918

[22] Filed: Dec. 13, 1996

Related U.S. Application Data

[60] Provisional application No. 60/009,117, Dec. 22, 1995.

[51] Int. Cl.[6] .......................... B23B 31/32; B23B 23/04
[52] U.S. Cl. ...................... 279/4.05; 82/150; 82/163; 279/133; 279/139; 279/141; 279/156; 279/157; 409/62; 451/385; 451/402
[58] Field of Search ........................... 279/2.05, 4.05, 279/133, 136, 139, 141, 156, 157, 137; 82/150, 162–165; 409/62; 451/385, 398, 402, 403

[56] References Cited

U.S. PATENT DOCUMENTS

| | | | |
|---|---|---|---|
| 1,749,339 | 3/1930 | Goad | 82/150 |
| 2,450,800 | 10/1948 | Hohwart et al. | 279/139 |
| 3,068,619 | 12/1962 | Mentley | 451/398 |
| 3,131,946 | 5/1964 | Newhouser | 279/133 |
| 3,234,851 | 2/1966 | Braun et al. | 409/62 |
| 3,608,915 | 9/1971 | Hohwart | 279/133 |
| 4,067,586 | 1/1978 | Morawski | 279/4.05 |
| 4,346,535 | 8/1982 | Asano et al. | 279/139 |
| 5,326,114 | 7/1994 | Piotrowski | 279/4.05 |
| 5,562,007 | 10/1996 | Seymour | 279/141 |

FOREIGN PATENT DOCUMENTS

| | | |
|---|---|---|
| 851034 | 10/1960 | United Kingdom . |
| 1119308 | 7/1968 | United Kingdom . |

*Primary Examiner*—Steven C. Bishop
*Attorney, Agent, or Firm*—Robert L. McDowell; Ralph E. Harper

[57] ABSTRACT

Workholding apparatus for mounting a workpiece (6) on a machine tool, the apparatus comprising a diaphragm chuck portion (2) and a tailstock portion (4). The chuck (2) includes a backing ring (70) with face portion (74) attached to the diaphragm (44) with the backing ring (70) having a centering locator guide (76) for centering and stopping the axial advancement of a workpiece in the chuck (2). The chuck (2) also includes a support ring (106) including material (109) located at the periphery thereof for sealing the area between the chuck and the workpiece and dampening vibrations brought about by the machining process. The tailstock portion (4) comprises a rotatable tailstock support (112) having at least one workpiece seating surface (117). The tailstock includes a centering locator guide (114) extending axially from the tailstock support (112) and having a generally curved outer surface (115) for centering the workpiece in the chuck (2). The tailstock portion (112) also comprises an outwardly flaring housing cover (118) including an end flange (124) and sealing means (126) whereby relative axial movement of the tailstock (112) toward the chuck (2) provides for the cover (118) to fit over a workpiece mounted in the chuck with the sealing means (126) contacting a surface of the workpiece radially inward of that portion of the workpiece being machined. The sealing means (126) preventing the introduction of contaminants into the workpiece (6) and chuck (2) and also providing for dampening of vibrations from the machining process.

20 Claims, 6 Drawing Sheets

WORKHOLDING APPARATUS

This application claims benefit of USC §119(e) of any U.S. provisional application Ser. No. 60/009,117, filed Dec. 22, 1995.

FIELD OF THE INVENTION

The present invention is directed to workholding equipment for machine tools and in particular to diaphragm chucks and tailstock devices for machines for manufacturing toothed articles such as gears and the like.

BACKGROUND OF THE INVENTION

In the manufacture of gears and components comprising gears, it is sometimes necessary, prior to final processing of the gear, to assemble a gear with other components. One example of this is a differential housing in which a spur or helical drive gear is attached to the housing prior to final grinding and/or honing. This is done in an effort to avoid heating a finished gear, such as by riveting or welding in the assembly process, which can distort and thus ruin the finished gear. Hence, the gear must be finish ground subsequent to welding or riveting in order to provide an acceptable quality.

When processing an assembled part comprising a gear, such as by grinding for example, one difficulty often encountered is proper positioning of the assembled part in the particular workholding equipment of the grinding machine. While a chuck mechanism may be capable of holding the part at one end thereof, the size or bulk of the part makes centering the part on the axis of the workholding equipment much more difficult than when machining a gear alone. Given this situation, it has been the prior practice to grip the workpiece at one end with a workholding means, such as a chuck, while utilizing a tailstock component in contact with the other end of the workpiece to assist with positioning the workpiece. Usually the workholding means and tailstock are oriented vertically in a grinding machine.

It is known to include means in the workholding mechanism to guide a workpiece into position and/or to axially align the workpiece in the workholding apparatus. One such example is shown in U.S. Pat. No. 3,234,851 to Braun et al. where a spring-loaded pilot pin is used to guide the cylindrical shank of a workpiece into the bore of the workholding device and a tailstock device is also utilized to contact the opposite end of the shank and keep the shank in the correct axial position. Another example is disclosed in U.S. Pat. No. 3,608,915 to Hohwart wherein a free-floating end stop comprising front and rear beveled washers is utilized to accommodate flexing or bending of the chuck body due to the pullback action of the chuck during clamping. U.S. Pat. No. 4,067,586 to Morawski teaches a diaphragm chuck including a locator having an angled locating face which is complementary with a locating face on a part to be clamped in the chuck. When the part is positioned in the chuck such that the faces are complementary, the part is axially positioned in the chuck and is then gripped by the chuck jaws.

Also, care must be exercised when clamping assembled parts, such as differential housings, since it is sometimes a hollow assembly component such as a hollow shaft which is clamped by the chuck jaws and too much clamping force may distort the component of the assembly. On the other hand, the maximum force capable of being withstood by the component being clamped may not be sufficient to hold the part in position once machining commences.

Still another disadvantage of the prior art mechanisms for clamping assembled parts in that the part as well as components of the workholding apparatus may be open to contamination by machining or cooling fluids, or metal chips which can enter the part or workholding equipment and have a detrimental effect on the performance of the workholding equipment or the assembled part.

It is an object of the present invention to provide a workholding mechanism wherein a workpiece can be tightly held against machining forces without distorting the workpiece while providing means to maintain the workpiece axially centered in the workholding mechanism.

It is a further object of the present invention to provide a means to prevent contamination of the workpiece and workholding mechanism while dampening vibrations in the workpiece due to the machining process.

SUMMARY OF THE INVENTION

The present invention is directed to a workholding apparatus for mounting a workpiece for machining on a machine tool, the apparatus having an axis extending the length thereof and comprising a diaphragm chuck portion and a tailstock portion.

The diaphragm chuck portion comprises a generally disc-shaped base portion, a generally cup-shaped body portion mounted adjacent the base, a piston member positioned in the cup-shaped body portion with the piston comprising a disc-shaped base and narrower axially-extending portion having an end.

The chuck further includes a nose portion secured to the cup-shaped body portion with the nose portion comprising a central opening in which the axially-extending portion of the piston member extends. Attached to the nose portion is a diaphragm having an outer surface from which a plurality of jaws protrude, the diaphragm including a central opening through which passes means to secure the diaphragm to the end of the axially-extending portion of the piston member whereby axial movement of said piston member in the cup-shaped body portion effects flexing of the diaphragm to open and/or close the jaws.

The chuck also includes a backing plate attached to the diaphragm. The backing plate comprises a backing ring and a face portion and includes a plurality of openings in the face portion to permit passage of the jaws therethrough. The face portion also includes a centering locator guide for centering and stopping the axial advancement of a workpiece in the chuck. Located axially outward of the backing plate is a damping and sealing assembly comprising a support ring having material located at the periphery thereof which is brought into contact with a workpiece for sealing the area between the chuck and the workpiece and dampening vibrations brought about by a machining process.

The workholding apparatus also includes a tailstock portion comprising a rotatable tailstock support having a inner surface at least a portion of which comprises a radiused surface for tangentially contacting an end surface portion of a workpiece opposite that end which contacts the stop surface of the chuck. The tailstock portion further includes a centering locator guide extending axially from the tailstock support in a direction toward the chuck, the locator guide having a generally curved outer surface for centering the workpiece in the chuck.

The tailstock portion also comprises a housing cover extending in an outwardly flaring manner from the tailstock support along the axis of the workholding apparatus, the cover including an end flange to which is attached a sealing means whereby relative axial movement of the tailstock toward the chuck provides for the cover to fit over a workpiece mounted in the chuck with the sealing means contacting a surface of the workpiece radially inward of that portion of the workpiece being machined. The sealing means preventing the introduction of contaminants into the workpiece and chuck and also providing for dampening of vibrations from the machining process.

DETAILED DESCRIPTION OF THE PREFERRED EMBODIMENT

The present invention will be discussed with reference to preferred embodiments and the accompanying drawings.

Figure 1:
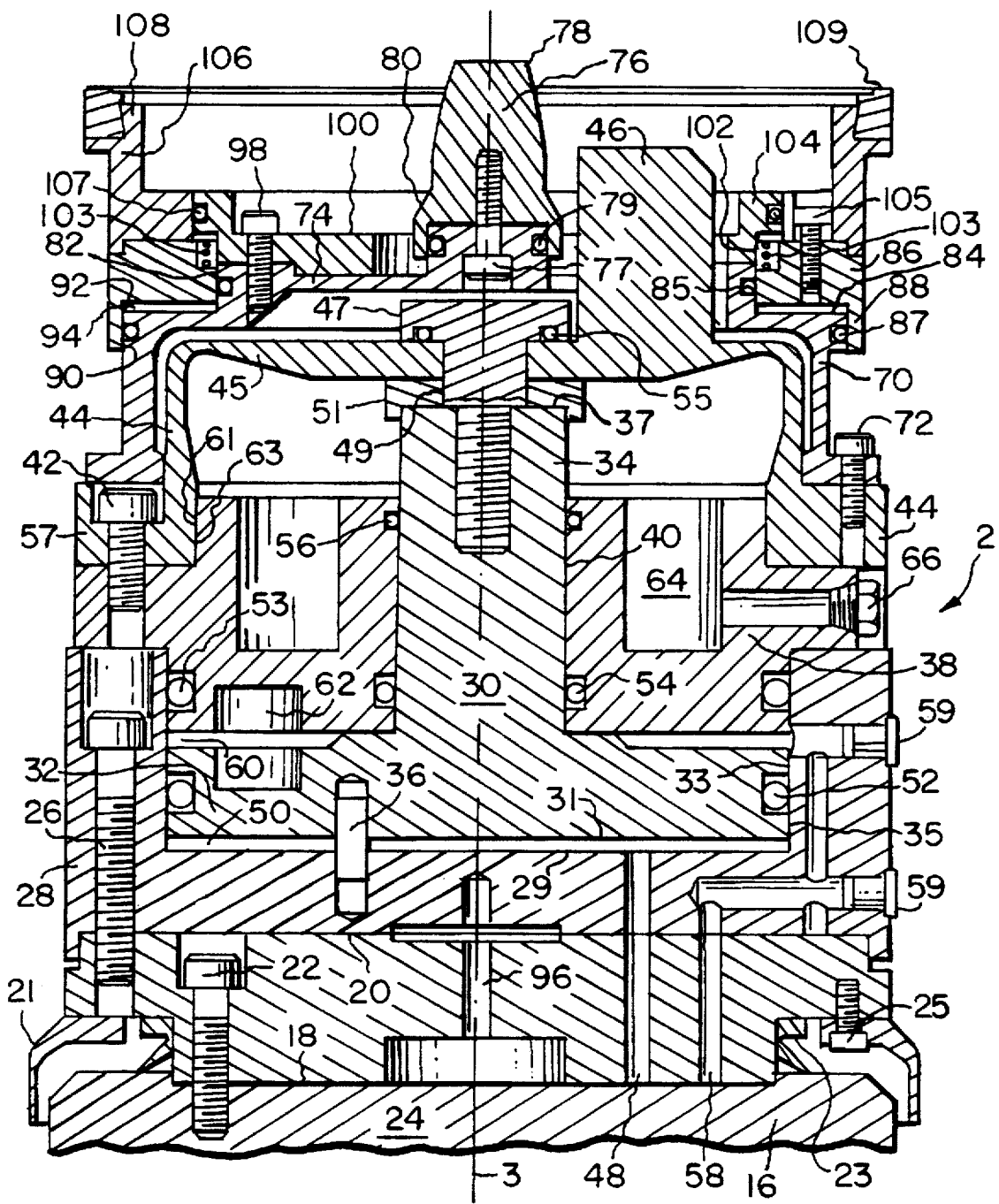
FIG. 1 is a axial cross-sectional view of a preferred diaphragm chuck according to the present invention.
Figure 4:
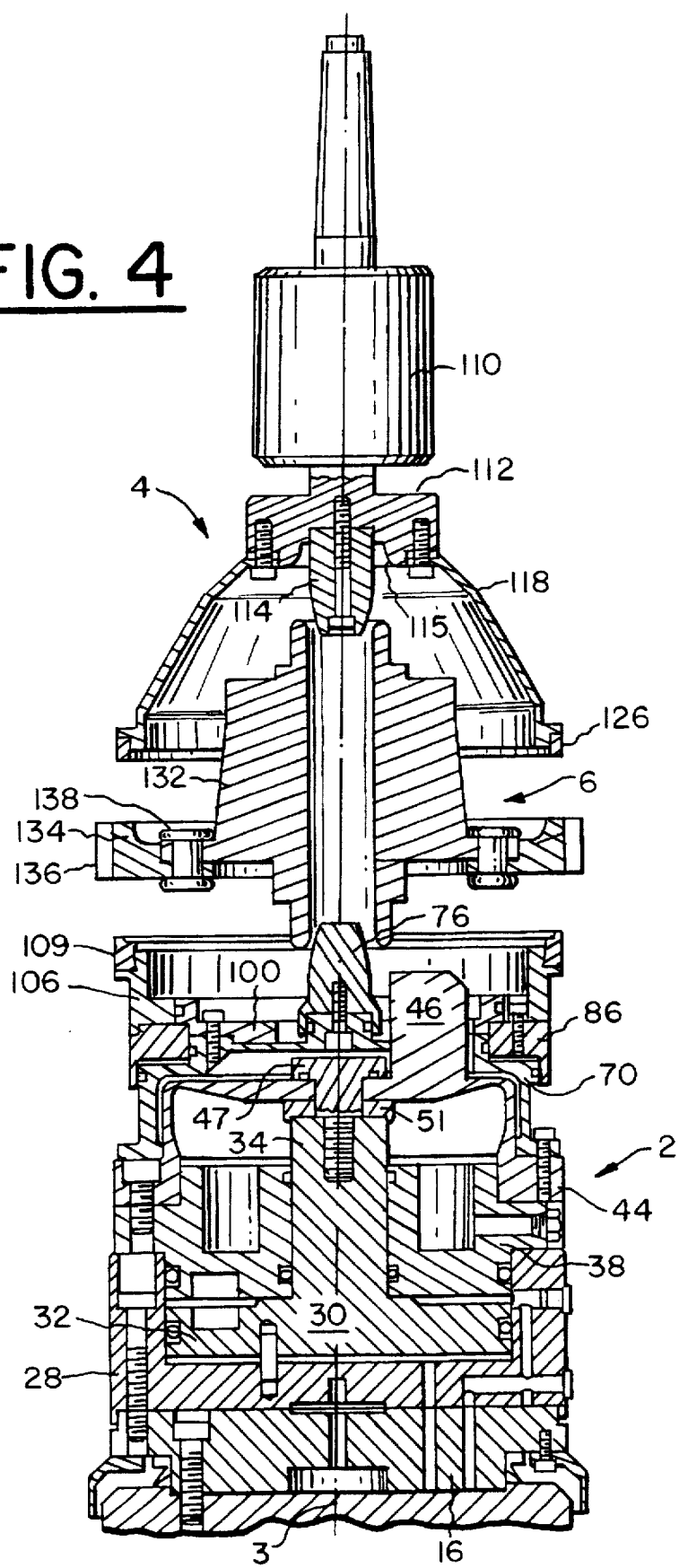
FIG. 4 is a axial cross-sectional view of a workpiece located between but prior to positioning in the diaphragm chuck and tailstock of the present invention.

FIG. 1 illustrates a preferred embodiment of the invention comprising a diaphragm chuck 2 for clamping a workpiece, such as the illustrated differential housing 6 of FIG. 4 comprising a spur or helical drive gear 134 secured to a housing 132 by rivets 138.

The chuck 2 is of the diaphragm type and includes an axis 3, a base portion 16 having a first side 18 and a second side 20. Chuck base 16 is mounted via screws 22 (only one is shown) to the spindle 24 of a machine tool such as, for example, a CNC threaded-wheel gear grinding machine and is usually mounted such that the axis 3 extends vertically when viewing the machine. Such grinding machines are widely known and readily available. A guard 21 affixed to chuck base 16 by screws 25 (only one is shown) and a seal 23 are included for keeping contaminants out of the area between the base 16 and the spindle 24.

Secured to base 16 by screws 26 (only one is shown) is chuck body 28 which is generally cup-shaped with the opening facing axially away from the base 16. Positioned for sliding movement inside of chuck body 28 is piston 30 comprising a disc-shaped head portion 32 and a narrower axially extending rod portion 34 which extends beyond the opening of chuck body 28. A key 36 is positioned in piston head 32 and chuck body 28 to prevent relative rotation between the chuck body 29 and the piston 30.

Secured to chuck body 28 by screws (not shown) is nose portion 38 which comprises a central opening 40 through which passes the rod portion 34 of piston 30. Attached to nose portion 38 via screws 42 (only one shown) is a diaphragm 44 having a flanged base 57 and comprising a plurality of jaws 46, preferably three, which are integral with and extend axially from the diaphragm 44. The diaphragm 44 is preferably made of steel, such as case carburized 8620 hardened to approximately Rc 62. The diaphragm 44 is attached to the end surface 37 of piston rod 34 by a screw 47 passing through an opening 49 in diaphragm 44, through a collar 51 and into the end of piston rod 34. Seal 55 (such as an O-ring type) prevents any contaminants from entering the interface between the screw 47 and diaphragm 44 which might adversely affect the performance of the diaphragm 44. The inside surface 61 of the diaphragm flange 57 is slightly tapered and is complementary with surface 63 of the nose portion 38. These tapered surfaces allow for easy and quick exchange of diaphragms.

In operation of the chuck 2 to open the jaws 46, fluid such as hydraulic fluid is supplied via channel 48 to chamber 50 located between the outer face 29 of chuck body 28 and the inner face 31 of piston head portion 32. Fluid pumped into chamber 50 causes axial movement of the piston 30 in an axial outward direction (i.e. axially away from spindle 24, or, upward when viewing FIG. 1). The peripheral surface 33 of piston head 32 slides along and is in sealing engagement (such as by seal 52 which, for example, comprises an O-ring type seal) with the inner wall surface 35 of chuck body 28. In a like manner, piston rod portion 34 slides along and is in sealing engagement (seals 54, 56) with the central opening 40 of nose portion 38. Outward axial movement of piston 30 causes outward flexing of the face portion 45 of diaphragm 44. This flexing causes the jaws 46 to open radially and permit a part, such as differential housing 6, to be inserted into the chuck 2 for gripping.

To close jaws 46, fluid pressure to chamber 50 is released and fluid in introduced via channel 58 into sealed chamber 60 (sealed at 52, 53) which effects axial movement of piston 30 in an axially inward direction (downward in FIG. 1) to cause inward flexing of diaphragm 44 thus radially closing jaws 46 to grip a workpiece 6. Plugs 59 are used to close those openings in the periphery of chuck body 28 which were formed during the machining process to provide fluid channel 58.

It is to be understood that while a piston has been shown as a preferred means to flex the diaphragm, other flexing means, such as a drawrod, are also contemplated by the present invention.

It should be noted that a resilient means, such as a spring (not shown), may be included in a chamber 62 located between piston head portion 32 and nose portion 38. The effect of a spring in chamber 62 is to constantly urge piston 30 in a downward direction to prevent the jaws 46 from opening in the event of a loss of fluid pressure to chamber 60.

It should also be noted that nose portion 38 includes a channel groove 64 open to the outer surface of the nose portion. Channel groove 64 is in communication with breather plug 66 located in the peripheral surface of the nose portion 38. The channel groove 64 and breather plug 66 are necessary to allow air to flow into and out of the area between the nose portion 38 and diaphragm 44 due to the changing volume of this area caused by the outward and inward flexing of the diaphragm 44.

Figure 2:
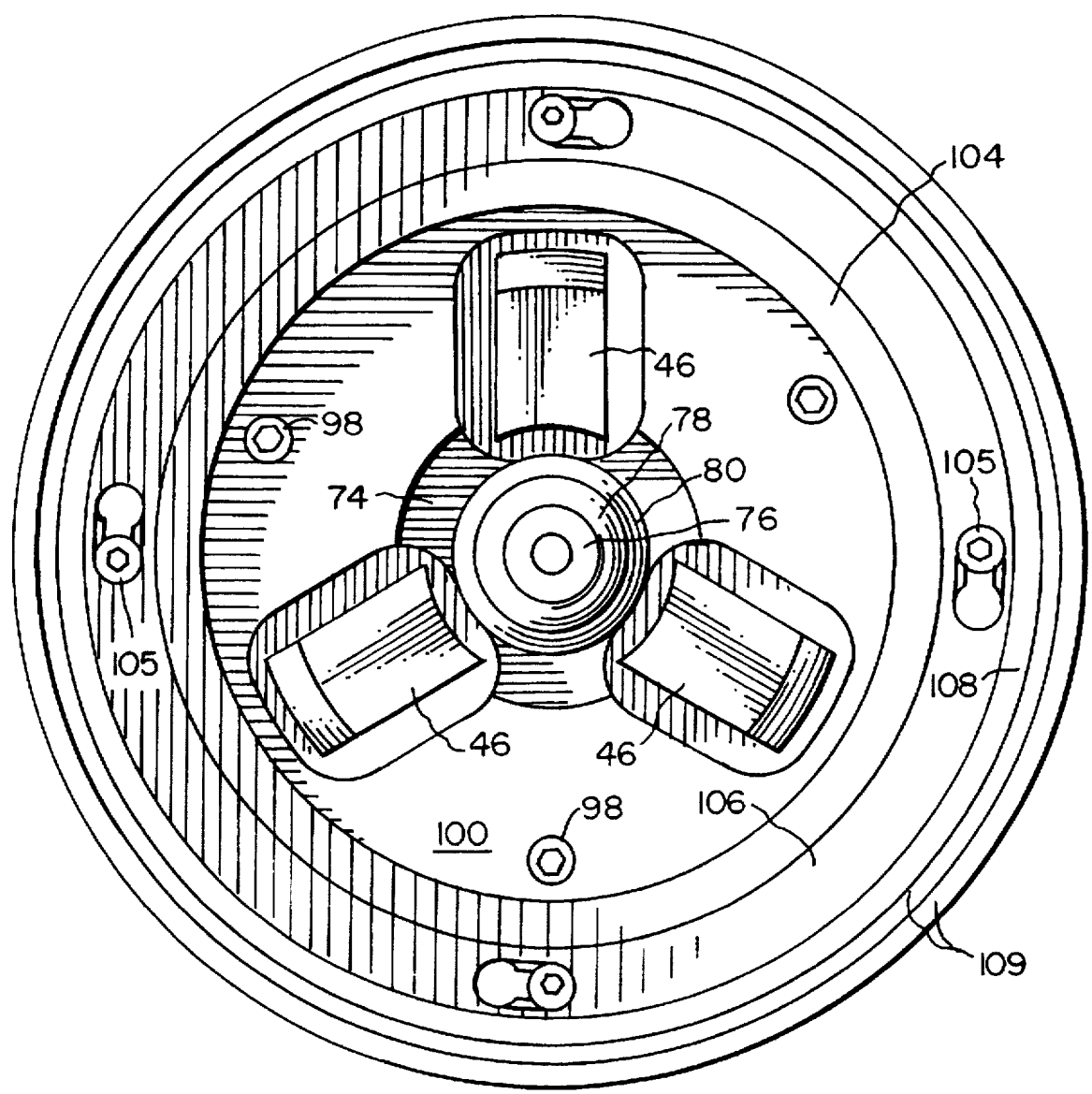
FIG. 2 is a view of the outer end of the diaphragm chuck of FIG. 1.

In continuing with the description of the chuck 2, a backing plate comprising backing ring 70 and face portion 74 is secured to diaphragm 44 by screws 72 (only one shown). The backing plate face portion 74 comprises openings therein to allow for passage of the jaws 46. See FIG. 2. The face portion 74 includes a center locator guide 76 attached to the face portion 74 via a screw 77. The center locator guide 76 comprises an outer generally curved surface 78 and an inner angled seating surface 80. Seal 79 is included to prevent contaminants from getting under locator guide 76 which could adversely alter the position of the locator guide 76. When a workpiece such as differential housing 6 is loaded (by any appropriate loading means) onto the chuck 2, the housing portion 10 is lowered onto locator guide 76 and then follows the curved contour 78 downward until the housing 10 is seated on the angled surface 80.

Once a workpiece is secured in chuck 2, a damping and sealing assembly located on the chuck may be advanced into position against the workpiece whereby contamination of the chuck by machining fluids and metal chips is prevented and vibrations due to the machining process are reduced. The damping and sealing assembly includes sliding ring 86, retainer plate 100, support ring 106 and damping and sealing ring 109 all of which will be described in detail below.

Included on the backing ring 70 is a shoulder having an axial surface 82 and a radial surface 84, the shoulder being positioned at the radial outer edge region of the face portion 74. Positioned for axial sliding movement in the shoulder surface 82 is sliding ring 86 which is generally rectangular in cross-section and includes a downwardly extending outer peripheral portion 88 which slides along an outer side portion 90 of backing ring 70. The radial portion 84 of backing ring 70, the inner radial face 92 of sliding ring 86, and seals 85 and 87 define a chamber 94 which communicates via channels (not shown) with inlet channel 96 through which a fluid, such as air, is introduced into the chamber 94 to effect outward axial movement of the sliding ring 86. Attached to backing ring 70 via screws 98 (only one shown in FIG. 1) is a retainer plate 100 having a peripheral surface wherein a portion of the peripheral surface comprises an axial surface 102 flush with surface 82 of the backing ring 70 to allow for further axial sliding movement of the sliding ring 86. The retainer plate 100 further includes a flanged portion 104 which functions as a stop surface for the sliding ring 86.

Attached to the sliding ring 86, via screws 105 (only one is shown), is a support ring 106 having an outer peripheral flanged portion 108 at the axial end thereof. A damping and sealing ring 109 is positioned in the peripheral flanged portion 108 of the support ring 106. The material of damping and sealing ring 109 being, for example, urethane or aircraft grade rubber-type sealing material. A seal 107 (such as an O-ring) is present between the flange portion 104 of the retainer plate 100 and the inner radial surface of support ring 106.

After a workpiece is loaded onto the chuck 2 and gripped, the sliding ring 86, and hence the support ring 106 and damping and sealing ring 109, is axially advanced, such as by air pressure introduced at inlet channel 96, to bring the damping and sealing ring 109 into contact with the workpiece at a location on the workpiece radially inward of the tooth surfaces being machined. See FIG. 5. With the damping and sealing ring 109 in place, no contaminating material can enter the area between the chuck 2 and the workpiece and the material of the ring 109 will assist in absorbing vibrations brought about by the machining process which would otherwise adversely influence the quality of the finished workpiece.

If desired, a resilient means, such as spring 103, may be included between the flange portion 104 and the sliding ring 86 to urge the sliding ring toward the chuck base 16 when air pressure through channel 96 is discontinued. Alternatively, a chamber similar to chamber 94 may be included between the flange portion 104 and the sliding ring 86 with the chamber communicating with another fluid pressure channel to urge the sliding ring 86 toward the chuck base 16 when air pressure is discontinued through channel 96 and commenced through the other channel. Preferably, however, when the air pressure in chamber 94 is removed, the sliding ring 86 and its associated components will move toward chuck base 16 due to their own weight or they may be pushed back toward chuck base 16 when a workpiece is loaded onto the chuck 2.

Figure 3:
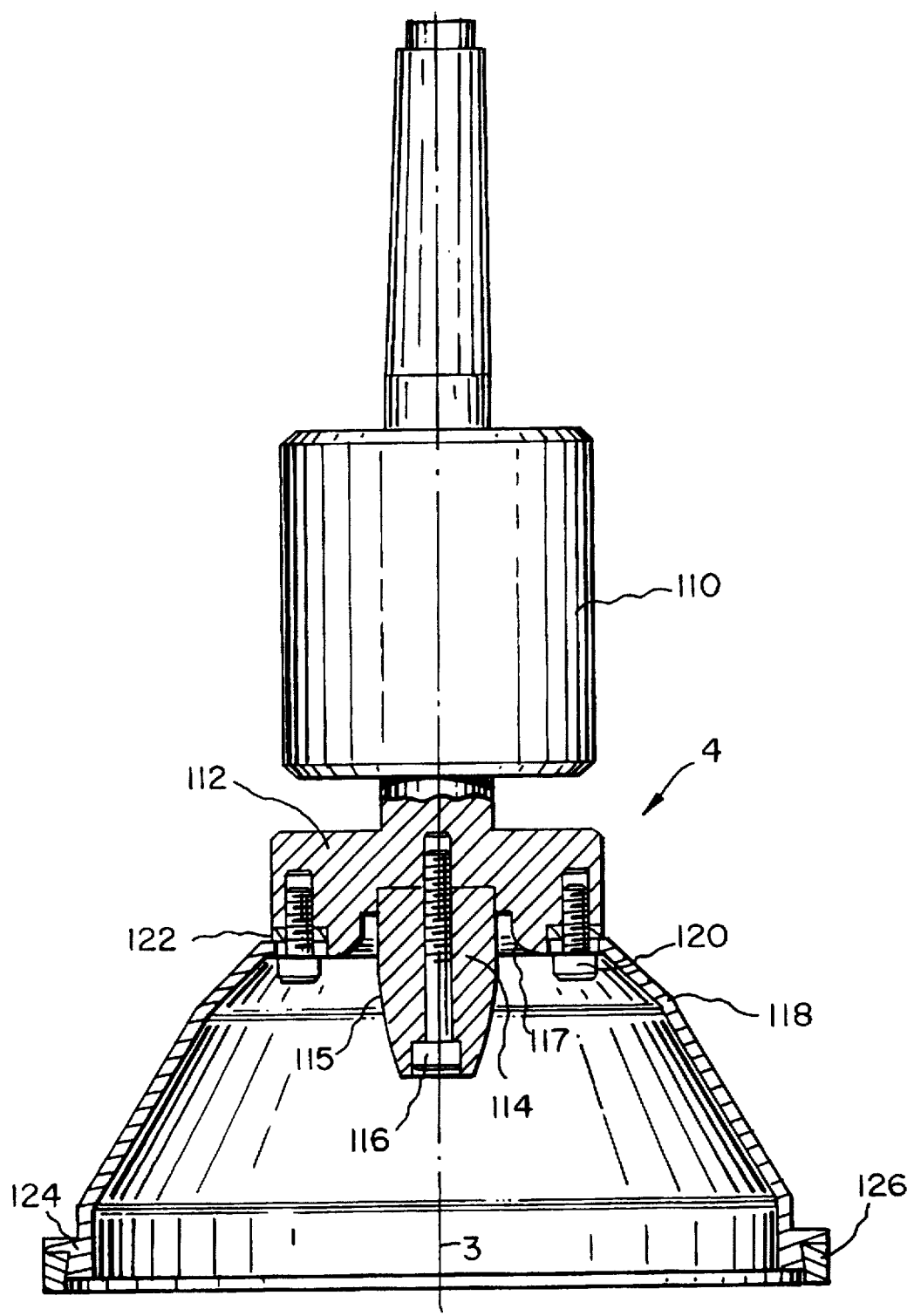
FIG. 3 is an axial cross-sectional view of a tailstock mechanism according to the present invention.

While a workpiece clamped with the chuck as described above would be held with sufficient force to prevent movement of the workpiece during machining and the accuracy of workpiece positioning (e.g. centering) thereon would be acceptable, a tailstock assembly 4, as shown in FIG. 3 for example, further improves the ability to precisely center the workpiece on the axis 3 of the chuck 2 and therefore, such a tailstock assembly may be utilized in combination with the chuck 2 of FIG. 1. However, it is to be understood that the tailstock assembly 4 also finds use with other chucking mechanisms as its ability to improve the centering of a workpiece is not solely limited to its use with the chuck 2.

The tailstock assembly 4 comprises a live center 110 which is attached to the machine tool. The live center 110 comprising bearings (not shown) to allow the tailstock to rotate when moved relative to the chuck 2 to position the tailstock 4 in contact with a workpiece and chuck which themselves must be rotatable in order for the workpiece to be indexed and/or ground by a threaded grinding wheel which is a continuous process.

The tailstock assembly 4 further includes a tailstock support 112 having a plurality, preferably three, of curved (preferably spherically-shaped) workpiece seating nodes 117 spaced about the underside of the support 112 to stop and align the end portion of the workpiece. Alternatively, the workpiece seating surface may be a continuous ring having a radiused crosssection extending around the underside of support 112. The tailstock support 112 also includes a center locator guide 114 having a curved outer surface 115 and attached to the tailstock support 112 by a screw 116. A flared cover 118 is also attached to the tailstock support by a plurality of screws 120 (two are shown) and shims 122. The cover 118 includes a flange 124 at its axial inner end and a damping and sealing ring 126 (of the same material as seal 109) positioned in a peripheral groove in the flange 124.

FIG. 4 illustrates a differential housing 6 prior to loading onto chuck 2. For illustrative purposes only, chuck 2, tailstock 4, and workpiece 6 are shown in closer proximity than would be practical for loading and/or unloading. The spacing of the components 2, 4 and 6 was selected in order to illustrate individual components on a single sheet. The differential housing 6 comprises a housing 132 and a drive gear 134 having teeth 136. The drive gear 134 is attached to the housing 132 by rivets 138.

With the present workholding apparatus, which comprises chuck 2 and tailstock 4, a workpiece is lowered (given the orientation of FIG. 4) onto the chuck centering locator guide 76. The curved outer surface 78 of locator 76 guides the shaft of the differential housing 6 onto the angled seating surface 80 (see FIG. 1). The jaws 46 of the chuck are then closed, as described above, to grip the workpiece and allow a loading means (not shown) to be moved away from the workholding components 2 and 4.

Figure 5:
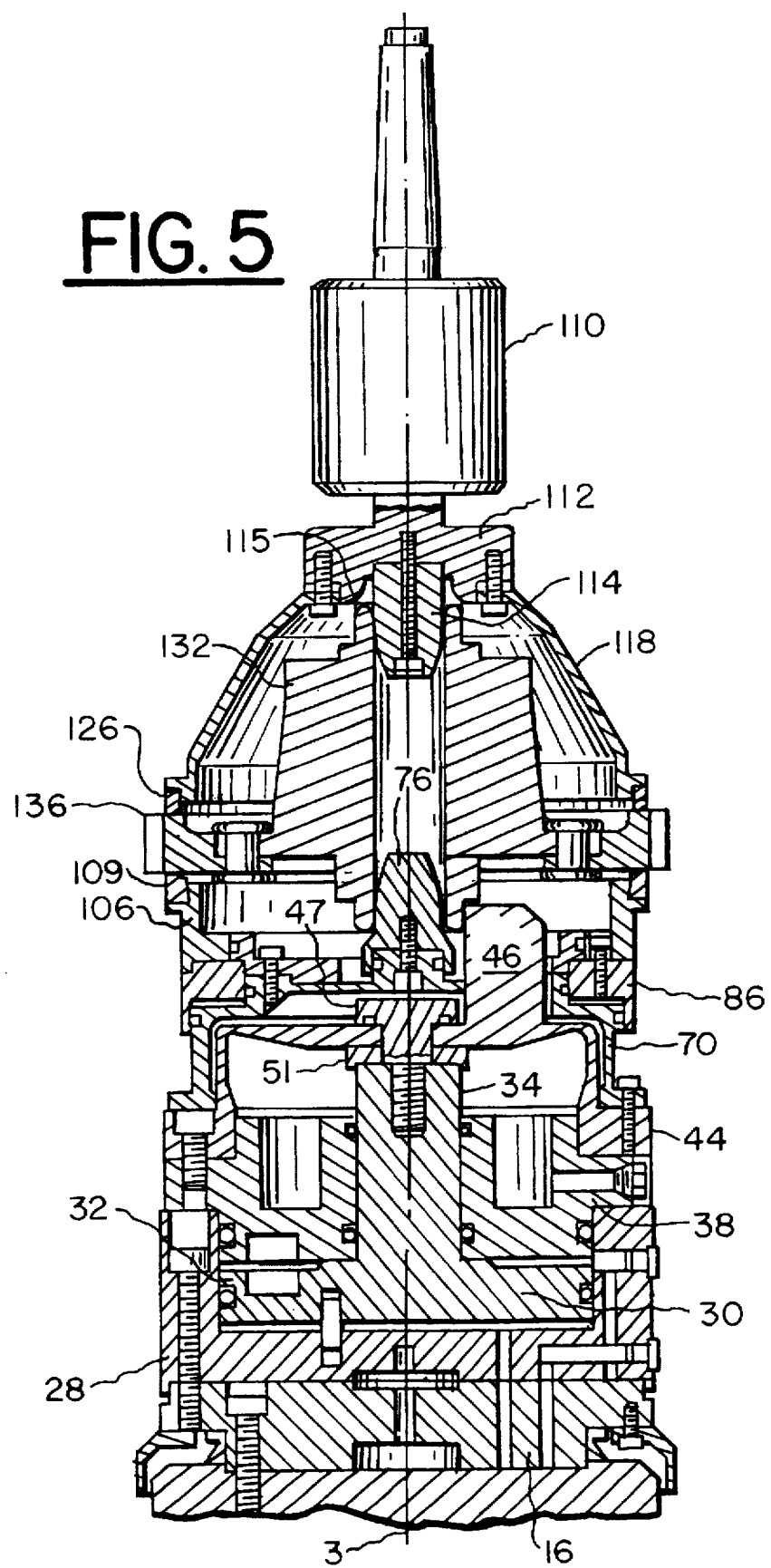
FIG. 5 illustrates an axial cross-sectional view of a workpiece positioned in the diaphragm chuck and tailstock of the present invention.

The tailstock 4 is then lowered and the chuck jaws 46 are released to allow the center locator guide 114 to enter the workpiece shaft at its outer end and guide the shaft along curved surface 115 and into engagement with stop surface 117. As stop surface 117 is engaged, the damping and sealing ring 126 contacts the workpiece 6 on its axially outer surface radially inward of the teeth 136 to seal the interface between the cover 118 and workpiece 6 and to absorb vibrations brought about by the machining process. The workpiece 6 is now centered at both ends thereof about the axis 3 of the workholding apparatus. The jaws 46 of the chuck 2 are again closed to finally grip the workpiece 6. Fluid pressure is then introduced into chamber 94 to axially advance sliding ring 86, ring support 106, and, dampening and sealing ring 109 in an outward direction to contact the ring 109 with the workpiece at a position radially inward of the teeth 136 of the gear 134. FIG. 5 illustrates the workpiece in the loaded, centered and gripped position.

Figure 6:
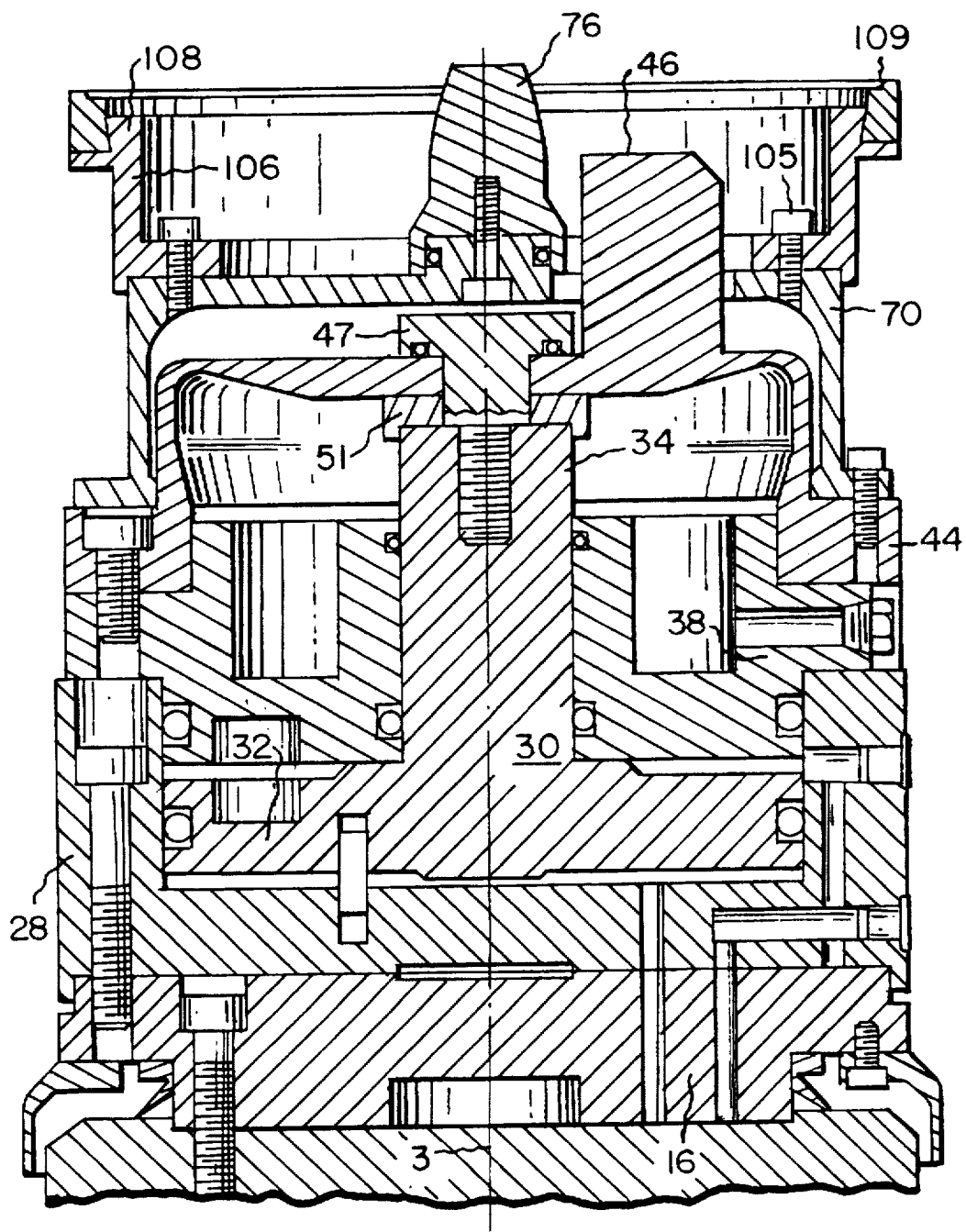
FIG. 6 is an axial cross-sectional view of an alternative diaphragm chuck according to the present invention.

FIG. 6 illustrates a modified embodiment of FIG. 1 wherein instead of an axially movable damping and seal ring 109, the support ring 106 is attached by screws 105 to backing plate 70 and thus is fixed in position. With this embodiment, sliding ring 86 and retainer plate 100 are eliminated. However, this embodiment requires a different support ring 106 for each dimensionally different workpiece to be mounted in the workholding apparatus.

Instead of being in a fixed position, the present invention further contemplates cover 118, flange 124 and damping and sealing ring 126 as an assembly movable into and out of engagement with a workpiece in a manner similar to the damping and sealing assembly discussed above with reference to the chuck 2.

The diaphragm chuck and tailstock support of the present invention provide for centering a workpiece at each end thereof, thus enhancing the positioning of the workpiece in the workholding apparatus and therefore improving the quality of the finished part. The cover on the tailstock support eliminates contamination of the workpiece and workholding apparatus by machining fluids and metal chips. The tapered mounting flange on the diaphragm permits fast exchange of diaphragms on the chuck. Also with the workholding apparatus of the present invention, there are few moving parts thus reducing the incidence of failure and making the workholding apparatus very reliable.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A chuck for mounting a workpiece for machining on a machine tool, said chuck having an axis extending the length thereof and comprising:

a generally disc-shaped base portion having opposed first and second sides with said first side mountable adjacent a spindle of a machine tool, a generally cup-shaped body portion mounted adjacent said second side of said base portion, said cup-shape body portion opening in a direction away from said base portion, a piston member positioned in said cup-shaped body portion, said piston comprising a disc-shaped base and narrower axially-extending portion having an end, said disc-shaped base being in sealing and slidable engagement with said cup-shaped body portion, said axially-extending portion projecting beyond said cup-shaped body portion opening, a nose portion secured to said cup-shaped body portion, said nose portion comprising a central opening in which said axially-extending portion of said piston member is in sealing and slidable engagement, said axially extending portion projecting beyond said nose portion, a diaphragm attached to said nose portion, said diaphragm having an outer surface from which a plurality of jaws protrude, said diaphragm including a central opening through which passes means to secure said diaphragm to said end of said axially-extending portion of said piston member whereby axial movement of said piston member in said cup-shaped body portion effects flexing of said diaphragm to open and/or close said jaws, a backing plate attached to said diaphragm, said backing plate comprising a ring portion and a face portion and including a plurality of openings in said face portion to permit passage of said jaws therethrough, said face portion also including a centering locator guide for centering and stopping a workpiece when positioned in said chuck, a damping and sealing means for sealing the area between said chuck and said workpiece and dampen vibrations brought about by a machining process.

2. The chuck of claim 1 further including means to introduce hydraulic fluid between said body portion and said piston base to axially move said piston away from said chuck base portion and causing said diaphragm to flex axially outward to open said jaws.

3. The chuck of claim 1 further including means to introduce hydraulic fluid between said nose portion and said piston base to axially move said piston toward said chuck base portion and causing said diaphragm to flex axially inwardly to close said jaws.

4. The chuck of claim 1 further including resilient means between said nose portion and said piston to urge said piston toward said chuck base portion.

5. The chuck of claim 1 further including a open groove-shaped chamber in said nose portion adjacent said diaphragm and communicating with a breather plug on the periphery of said nose portion, said chamber allowing for transference of a volume of air into and out of the area between said nose portion and said diaphragm due to the changing volume of air in said area caused by the flexing of said diaphragm.

6. The chuck of claim 1 further including means to position diaphragms attached to said nose portion, said means comprising providing an axially tapered shoulder portion adjacent the periphery of said nose portion and including a mounting flange on said diaphragm, said flange having an inner tapered surface complementary to said tapered shoulder portion whereby said diaphragm is precisely positioned on said nose portion.

7. The chuck of claim 1 wherein said centering locator guide protrudes axially away from said backing plate and comprises a first portion having a first generally curved surface to guide a workpiece into a centered position in said chuck and a second angled stop surface against which said workpiece seats.

8. The chuck of claim 1 further including in combination therewith a tailstock means mounted to said machine tool and positioned on said chuck axis and axially movable relative to said chuck on said chuck axis, said tailstock means comprising:

a rotatable tailstock support having a inner surface at least a portion of which comprises a spherical surface for tangentially contacting an end surface portion of a workpiece opposite that end which contacts said stop surface, a centering locator guide extending axially from said tailstock support in a direction toward said chuck, said locator having a generally curved outer surface for centering said workpiece in said chuck, a housing cover extending in a flared manner from said tailstock support along said axis, said cover including an end flange to which is attached a sealing means whereby relative axial movement of said tailstock and said chuck provides for said cover to fit over a workpiece mounted in said chuck with said sealing means contacting a surface of said workpiece radially inward of that portion of said workpiece being machined, said sealing means preventing the introduction of contaminants into said workpiece and said chuck and also providing for dampening of vibrations from a machining process.

9. The chuck of claim 1 wherein said damping and sealing means comprises a damping and sealing assembly movable from a position remote of a chucked workpiece to a position in contact with said workpiece to seal the area between said chuck and said workpiece and dampen vibrations brought about by a machining process.

10. The chuck of claim 9 wherein said damping and sealing assembly comprises:

a sliding ring in axial sliding engagement with said backing plate, a retaining plate attached to said backing plate, a portion of the periphery of said retaining plate being in axial sliding engagement with said sliding ring, the remaining portion of the periphery of said retaining plate being a flange having a surface forming a retaining surface for said sliding ring, a support ring attached to said sliding ring, said support ring comprising a flange portion in which is positioned a sealing and damping material, said support ring being axially movable from a position wherein said material does not contact said chucked workpiece to a position wherein said material contacts said chucked workpiece, the axial movement being effected by said sliding ring moving along said backing ring and retaining plate.

11. The chuck of claim 10 wherein fluid is introduced between radial surfaces of said backing ring and said sliding ring to effect said axial movement of said sliding ring along said backing ring and retaining plate.

12. The chuck of claim 10 further including resilient means located between said sliding ring and said retaining surface to urge said sliding plate in an axial direction toward said chuck base portion.

13. The chuck of claim 1 wherein said damping and sealing means comprises a support ring fixed to said chuck, said support ring comprising a flange portion in which is positioned a sealing and damping material, said material being in a position to contact a workpiece in a chucked position in said chuck.

14. A workholding apparatus for mounting a workpiece for machining on a machine tool, said apparatus having an axis extending the length thereof and comprising a chuck portion and a tailstock portion, said chuck portion comprising:

a generally disc-shaped base portion, a generally cup-shaped body portion mounted adjacent said base, a piston member positioned in said cup-shaped body portion, said piston comprising a disc-shaped base and narrower axially-extending portion having an end, a nose portion secured to said cup-shaped body portion, said nose portion comprising a central opening in which said axially-extending portion of said piston member extends, a diaphragm attached to said nose portion, said diaphragm having an outer surface from which a plurality of jaws protrude, said diaphragm including a central opening through which passes means to secure said diaphragm to said end of said axially-extending portion of said piston member whereby axial movement of said piston member in said cup-shaped body portion effects flexing of said diaphragm to open and/or close said jaws, a backing plate attached to said diaphragm, said backing plate having a face and including a plurality of openings on said face to permit passage of said jaws therethrough, said face also including a centering locator guide for centering and stopping a workpiece in said chuck, a damping and sealing means adjacent to said backing plate, said assembly including material located at the periphery thereof for contacting a workpiece for sealing the area between said chuck and said workpiece and dampening vibrations brought about by a machining process, said tailstock portion comprising:

a rotatable tailstock support having a inner surface at least a portion of which comprises a radiused surface for tangentially contacting an end surface portion of a workpiece opposite that end which contacts said stop surface, a centering locator guide extending axially from said tailstock support in a direction toward said chuck, said locator having a generally curved outer surface for centering said workpiece in said chuck, a housing cover extending in a flared manner from said tailstock support along said axis, said cover including an end flange to which is attached a sealing means whereby relative axial movement of said tailstock toward said chuck provides for said cover to fit over a workpiece mounted in said chuck with said sealing means contacting a surface of said workpiece radially inward of that portion of said workpiece being machined, said sealing means preventing the introduction of contaminants into said workpiece and said chuck and also providing for dampening of vibrations from the machining process.

15. The apparatus of claim 14 wherein said damping and sealing means comprises a damping and sealing assembly axially movable from a position remote of a chunked workpiece to a position in contact with said workpiece to seal the area between said chuck and said workpiece and dampen vibrations brought about by a machining process.

16. The apparatus of claim 15 wherein said damping and sealing assembly comprises:

a sliding ring in axial sliding engagement with said backing ring, a retaining plate attached to said backing ring, a portion of the periphery of said retaining plate being in axial sliding engagement with said sliding ring, the remaining portion of the periphery of said retaining plate being a flange having a surface forming a retaining surface for said sliding ring, a support ring attached to said sliding ring, said support ring comprising a flange portion in which is positioned a sealing and damping material, said support ring being axially movable from a position wherein said material does not contact said chucked workpiece to a position wherein said material contacts said chucked workpiece, the axial movement being effected by said sliding ring moving along said backing ring and retaining plate.

17. The chuck of claim 16 wherein fluid is introduced between radial surfaces of said backing ring and said sliding ring to effect said axial movement of said sliding ring along said backing ring and retaining plate.

18. The chuck of claim 16 further including resilient means located between said sliding ring and said retaining surface to urge said sliding plate in an axial direction toward said chuck base portion.

19. The chuck of claim 14 wherein said damping and sealing assembly comprises a support ring attached to said backing ring, said seal ring comprising a flange portion in which is positioned a sealing and damping material, said material being in a position to contact a workpiece in a chucked position in said chuck.

20. A tailstock mechanism for positioning a workpiece on a machine tool, said tailstock mechanism having an axis and comprising:

a rotatable tailstock support having an inner surface at least a portion of which comprises at least one curved face for contacting an end surface portion of a workpiece, a centering locator guide extending axially away from said tailstock support, said locator having a generally curved outer surface, a housing cover extending in a flared manner from said tailstock support along said axis, said cover including an end flange to which is attached a sealing means whereby contact with a workpiece provides for said cover to fit over said workpiece with said sealing means contacting a surface of said workpiece radially inward of that portion of said workpiece being machined, said sealing means preventing the introduction of contaminants into said workpiece and providing for dampening of vibrations from a machining process.

* * * * *